United States Patent
Reichel et al.

(10) Patent No.: US 10,605,401 B2
(45) Date of Patent: Mar. 31, 2020

(54) EXPANSION JOINT CONTAINING DYNAMIC FLANGE

(71) Applicant: Frenzelit GmbH, Bad Berneck, Bavaria (DE)

(72) Inventors: Harald Reichel, Gefrees (DE); Ulf Poehlmann, Gefrees (DE)

(*) Notice: Subject to any disclaimer, the term of this patent is extended or adjusted under 35 U.S.C. 154(b) by 715 days.

(21) Appl. No.: 15/177,761

(22) Filed: Jun. 9, 2016

(65) Prior Publication Data
US 2016/0363252 A1 Dec. 15, 2016

Related U.S. Application Data (60) Provisional application No. 62/174,552, filed on Jun. 12, 2015.

(51) Int. Cl.
*F16L 59/18* (2006.01)
*F16L 59/21* (2006.01)

(52) U.S. Cl.
CPC ............. *F16L 59/184* (2013.01); *F16L 59/21* (2013.01)

(58) Field of Classification Search
CPC . F16L 59/00; F16L 59/21; F16L 59/22; F16L 59/168; F16L 59/184; F16L 59/185

USPC ............... 285/45, 47, 187, 288.1–288.9, 905
See application file for complete search history.

(56) References Cited

U.S. PATENT DOCUMENTS

| | | | | |
|---|---|---|---|---|
| 3,730,566 A | * | 5/1973 | Kazmierski, Jr. | ... F16L 27/1004 285/229 |
| 3,841,207 A | * | 10/1974 | Piot | ......................... E04H 12/28 285/363 |
| 4,299,414 A | * | 11/1981 | Bachmann | ............. F16L 51/021 285/187 |
| 4,848,803 A | * | 7/1989 | Bachmann | ............... F01D 25/30 285/47 |
| 5,378,026 A | * | 1/1995 | Ninacs | ................... F16L 51/024 285/229 |
| 5,653,474 A | * | 8/1997 | Ninacs | .................... F16L 23/14 285/224 |
| 7,793,507 B2 | | 9/2010 | Poccia et al. | |
| 8,800,300 B2 | * | 8/2014 | Hashimoto | ............. F01D 25/30 239/265.11 |

* cited by examiner

*Primary Examiner* — Anna M Momper
*Assistant Examiner* — Fannie C Kee (57) ABSTRACT

An expansion joint that includes a rolled two-step shaped stainless steel dynamic flange welded atop a cylindrical inner sleeve, such that the inner sleeve connects on one end to gas exhaust, such that the expansion joint withstands thermal shock due to quick rise in temperatures.

20 Claims, 13 Drawing Sheets

Flow Direction →

EXPANSION JOINT CONTAINING DYNAMIC FLANGE

FIELD OF THE INVENTION

The present application relates generally to an expansion joint for use between ducts, such as a gas turbine engine exhaust duct to a duct of another structure, and capable of withstanding thermal shock due to the quick rise in temperature.

BACKGROUND OF THE INVENTION

A gas turbine typically compresses air and mixes it with fuel. The fuel, usually natural gas, is burned and the combusted gas expands to provide work. The gas turbine is coupled to and drives an electrical generator that produces electricity. After passing through the turbine, the hot gas passes to the gas turbine exhaust and exhaust stack into the atmosphere.

Gas-fired power plants are widely used, especially during peak or unscheduled demand, as they can be turned on and off within minutes. However, the many starts and stops along with high temperatures, pressure and velocity, puts additional stress on the duct and pipe systems. The increase in production demands the installation of highly engineered expansion joints to compensate for these stresses.

Figure 3:
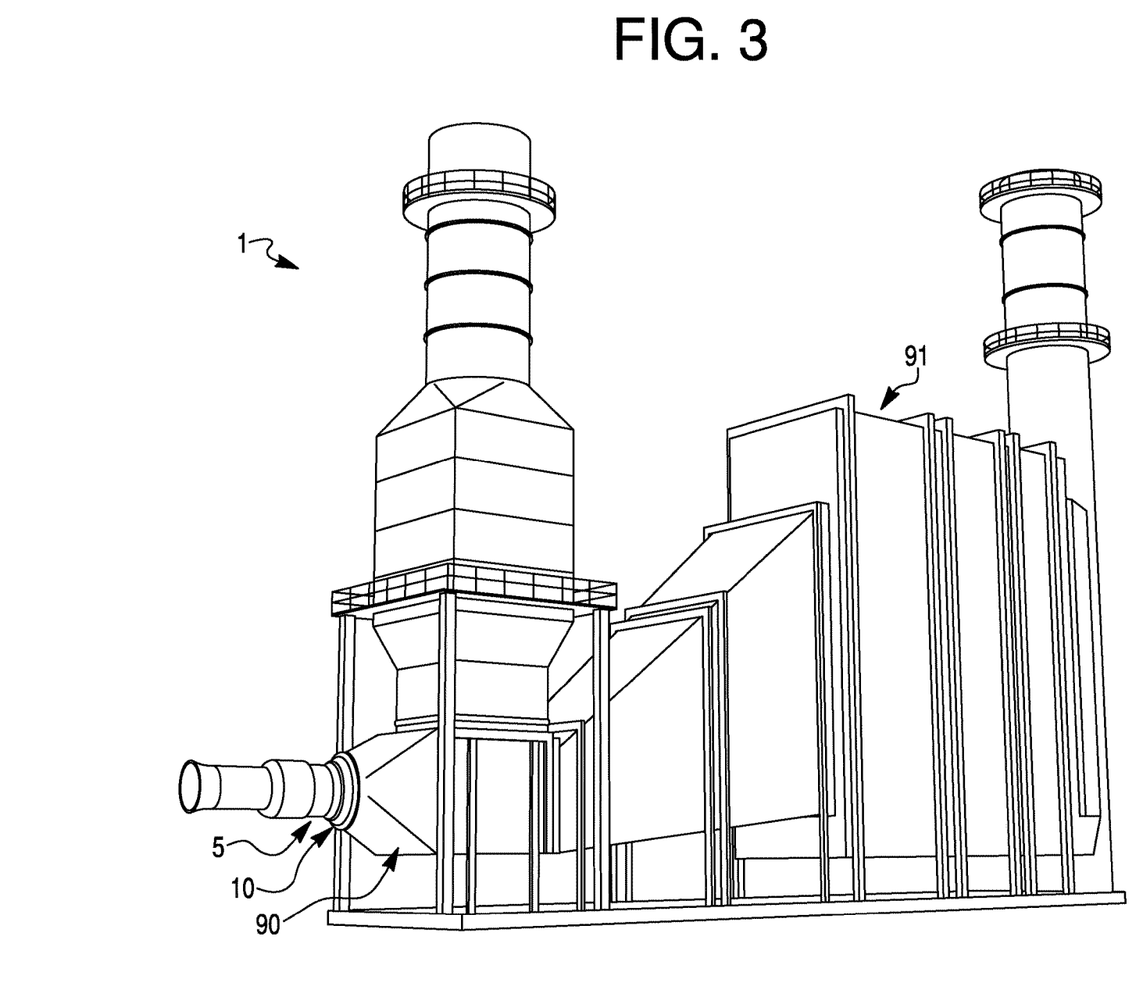
FIG. 3 is a general view of the expansion joint incorporated within a gas turbine exhaust system.

Typically, as shown in FIG. 3, gas turbine plan 1 has an expansion joint assembly 10 positioned between a turbine duct flange 5 and a diffuser duct 90, prior to the bypass exhaust stack 91, wherein the diffuser duct provides performance benefits to the turbine as a whole by expanding the exhaust gases to achieve optimum aerodynamic pressure recovery. Most turbine ducts run hot and are machined structures, while most diffuser ducts are lower cost fabricated casings that are internally insulated and relatively cold. Because of the thermal mismatch at this connection, an expansion joint is generally used to accommodate the large relative displacements between these components.

Ducting expansion joints are usually flexible connectors, which are designed to provide stress relief in ducting systems to absorb movement in the component parts of the ducting caused by thermal changes. Such ducting expansion joints also act as vibration isolators and compensate for minor misalignment of interconnecting ducts. Such expansion joint structures are also fabricated from a variety of metallic or non-metallic materials, including synthetic elastomers, fabrics, insulation materials, and plastics, depending on the designs. Such ducting expansion joints also find many applications, such as in smelters, refuse incineration and power generation plants, such as coal- or oil-fired plants, gas turbine plants, coal/oil/gas cogeneration plants, nuclear power plants, and also in pulp and paper plants and refineries, foundries, steel mills, etc.

Known expansion joints can take many forms, when relatively large axial, vertical, and lateral movements are expected.

U.S. Pat. No. 7,793,507 to Poccia, et al. teaches an expansion joint for use between a turbine duct and an exhaust duct. The expansion joint includes a flange attached to the turbine duct and a number of plates attached to the exhaust duct that extend towards the flange. The plates and the flange include a gap there between, the gap being narrower when the turbine duct is hot than when the turbine duct is cold. The expansion joint further includes a flexible element positioned between the turbine duct and the exhaust duct. The flexible element may be a nickel-based alloy. The flexible element is attached to the flange.

However, Poccia does not address the issue of flange stress caused by quick startup, and the gap design is not applicable to general gas turbine exhaust systems, which require a good seal within the joints to completely transfer the hot gas to exhaust stacks.

Figure 1:
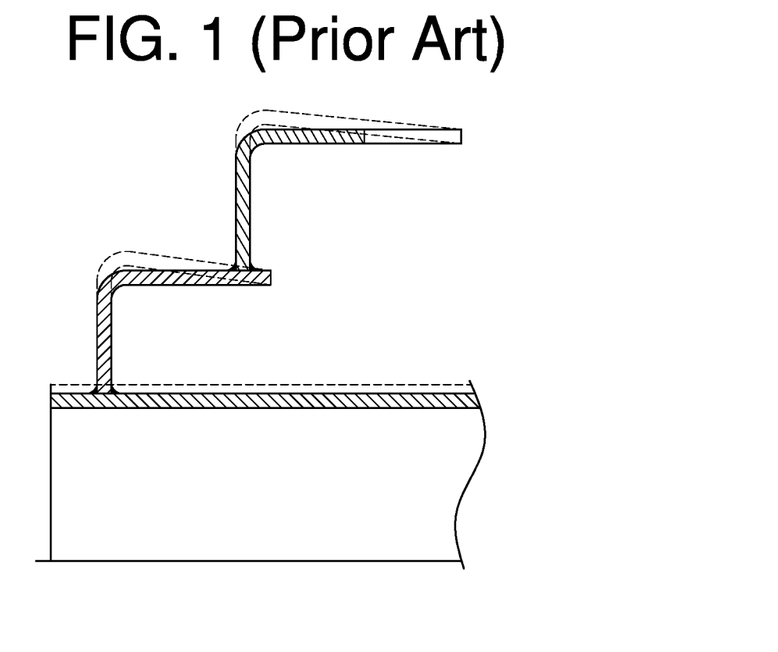
FIG. 1 is a cross-section of a prior art carbon steel heat absorption flange to control the heat stresses in an exhaust duct of a gas turbine.

The expansion joint preferably provides a smooth aerodynamic transition between the ducts. For expansion joint assemblies of more than 4500 mm diameter, an angle rolled flange design has been produced to control thermal expansion of metal ducts. A standard design of such rolled angle flange is shown in FIG. 1, which shows a rolled angle heat absorption assembly made from A204 or A387 carbon steel of 6-8 mm thickness. The rolled angles or strips are welded together to create a dynamic system useful to control thermal expansion in duct systems for handling gas temperatures up to a maximum of 1004° F.

The two-step rolled carbon steel design allows for: 1) a reduction up to 50% of the temperature gradient; 2) a temperature reduction in both the lateral and axial directions; and 3) the deflected shape shown in dotted lines in FIG. 1 of the flange provides additional stress relief. The deflected shape is the result of the different degrees of radial growth that result from the thermal gradient that forms from the interior flow shield to the outermost damping area.

However, operating temperatures are now up to 1250° F. and above for new and more energy efficient gas turbines. The high operating temperature results in increased temperature gradients and associated increase in deflection stresses. In addition, the start-up time to full energy output of gas turbines has been reduced from 15 minutes to 6 minutes. The shorter start-up to maximum energy is faster than the heat absorption frame material can absorb and distribute the heat, thus, resulting in a larger thermal gradient and further compounding the dynamic balance between stress and maximum capacity for temperature. In addition to these changes, the number of start-up/shut down cycles has almost doubled. These frequent cold/hot/cold cycles introduce mechanical stresses in the form of fatigue. Such harsh operating conditions require special stainless steel materials like SS 347 or SS 321 to keep the dynamic thermal absorption system functional at these temperatures and stresses.

Figure 2:
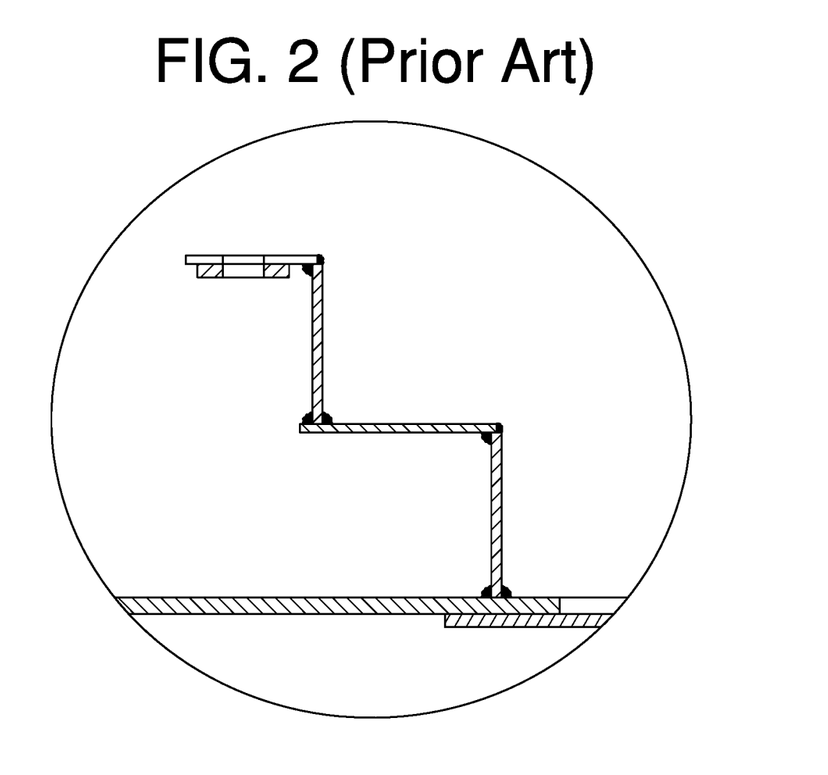
FIG. 2 is a prior art stainless steel heat absorption flange to control the heat stresses in an exhaust duct of a gas turbine.

Stainless steel materials are difficult to produce into a flexible heat absorption flange with roll formed shapes as shown in FIG. 1, and therefore, stainless steel thermal absorption systems or flanges are fabricated as laser cut bands and arcs. Each wall or arc section is then welded into the step shape as shown in FIG. 2. This is especially the case for smaller diameter frames in the 3600 mm range. However, the welded design shown in FIG. 2 has become problematic for new turbine designs with the higher temperatures and reduced time to maximum output. The numerous welded areas have become the weak link in the design as a result of the additional stresses associated with the increased thermal gradient. This introduces an uncertainty factor for the welding, and requires that the welds be more tightly controlled and more vigorously inspected to insure integrity of the thermal absorption assembly, thus driving up manufacturing costs and also requiring the introduction of an increased safety factor leading to reduced cycle life.

U.S. Pat. No. 5,378,026 to Ninacs, et al. teaches a cylindrical flexible joint unit of circular cross-section having an inner annular flexible wall structure with an inner cylindrical sleeve, and an annular step connecting flange secured about the outer surface of the sleeve and forming an annular air space between the inner sleeve and the step connecting flange, wherein a rolled two-step shape design provides substantial stress level reduction. However, Ninacs' design retains a minimum of three welding points, and the geometry of the steps is such that the horizontal legs of the steps are grossly larger than the vertical legs, and thus unable to provide sufficient flex for the flange to be applicable in modern gas turbine operation, as the operational temperatures are now higher, up to 1250° F. Further, without the proper channel to expand or flex according to the heightened heated conditions, the sleeve will deform and most likely tear the back end of Ninacs' flange, exposing and losing insulation material due to gas velocity. Ninacs also utilizes Armco #409 stainless steel, a type of ferritic stainless steel that has inferior weld ability, low elongation factor, and is thus unsuitable for current gas turbine operation.

Therefore, there is a desire for an improved turbine expansion joint containing a dynamic or flexible flange for modern turbine design, such that the flange retains the rolled two-step design, reduces the amount of critical welds, and imparts minimal fatigue.

SUMMARY OF THE INVENTION

The invention is directed towards an expansion joint for use between ducts, such as between a turbine duct and a diffuser duct or elsewhere, comprising an annular dynamic flange that is of a two-step shape, a cylindrical inner sleeve, and optionally a plurality of expansion slots, wherein the flange is welded and perpendicular to the outer surface of the inner sleeve, and the optional slots are located on the inner sleeve and adjacent to the flange. The expansion joint is adapted to the shape of both of the ducts, such that the joint is placed concentrically around a duct for transporting hot gases such as a turbine exhaust duct and a diffuser duct, to control thermal expansion and contraction of such duct. The inventive expansion joint withstands an operational temperature of 1250° F. and above and a startup time of six minutes or less.

DETAILED DESCRIPTION OF THE INVENTION

The invention is directed towards an expansion joint for use between ducts, such as between a turbine duct and a diffuser duct or elsewhere. The expansion joint comprises an annular stainless steel dynamic flange that is of the shape of two-steps, a cylindrical inner sleeve, and optionally, a plurality of expansion slots, wherein the flange is welded and perpendicular to the outer surface of the inner sleeve, and the slots are spaced on the inner sleeve and adjacent to the flange. Specifically, the dynamic flange comprises a first annular bent step and a second annular bent step, wherein the first annular bent step is welded on one end to a first end of the second annular bent step, and the second annular bent step is welded on its second end to an outer surface of said inner sleeve, such that said first and said second annular bent steps each has a wall that is parallel to said cylindrical inner sleeve or the gas flow, and a second wall that is perpendicular to said cylindrical inner sleeve or the gas flow, wherein the ratio of the length of said parallel wall of said first or second annular step to the length of said perpendicular wall of said first or second annular step is about 1.5:1 to 1:2.

The expansion joint 10 as previously mentioned with regard to FIG. 3 is adapted to the shape of both of the ducts, such that the joint 10 is placed concentrically around a duct for transporting hot gases such as a turbine exhaust ducts and a diffuser duct 90, to control thermal expansion and contraction of such ducts, and withstands an operational temperature of 1250° F. and above and a startup time of six minutes or less.

The invention is further directed to an expansion joint comprising a stainless steel dynamic flange that has a two-step shape, wherein each step is made from 1) bending at least one stainless steel blank in the direction of the molecular grain of the steel to form a 90° angle, then rolling the bent stainless steel against the grain to form an annular shape or arc, 2) welding a plurality of the rolled or arc steps together to form an annular bent step, and 3) welding the annular bent step to a separately rolled annular bent step of a smaller radius to form a two-step flexible flange, wherein one end of the two-step flange is welded and perpendicular to the outer surface of an annular inner sleeve. The annular inner sleeve preferably contains a plurality of expansion slots, such that the slots are adjacent to the flange. The second end of the flange is bolted together with a cover that houses the expansion joint, and includes at least one insulation material underneath, wherein the insulation material is also adjacent to both the outer surface of the annular inner sleeve and the flange, such that at least one insulation material conforms to the shape of the flange. The flange shifts and bends according to the cooling and heating of the expansion joint, and exerts minimal stress as compared to the prior art design.

As defined herein, "stainless steel" or inox steel for the present invention is a steel alloy containing at least 10.5 wt. % chromium, preferably 13 wt. %, and most preferably 18-20 wt. % chromium and other minerals selected from the group consisting of nickel, manganese, molybdenum and mixtures thereof. Austenitic stainless steel is the preferred steel material for the inventive expansion joint and dynamic flange. SS 347, SS 321, AISI 321, AISI 347; other 200 and 300 series of austenitic steel and similar alloys are useful. Additionally, the useful stainless steel has a tensile strength of approximately 75,000 PSI minimum and yield strength at approximately 30,000 PSI minimum with approximate elongation in 50 mm at 40%. More preferably, useful stainless steel has a tensile strength of approximately 89,900 PSI minimum and a yield strength at approximately 34,800 PSI minimum with elongation in 50 mm at 45%. Most preferably, useful stainless steel has a tensile strength of approximately 100,000 PSI minimum and a yield strength at approximately 65,300 PSI with approximate elongation in 50 mm at 40%.

It must be noted that stainless steel for the present invention is wholly distinct from carbon steel and ferritic steel, which are excluded from the scope of the present invention, as both carbon steel and ferritic steel are not applicable in modern gas turbine systems that have a high temperature requirement and shorter up and down times.

The term "dynamic flange" is synonymous to and used interchangeably with, a flexible flange, and defined herein as a stainless steel flange that is bendable under heated conditions and flexible to form its original shape during cooled conditions.

The term "rolled design" is defined herein as rolling a bent stainless steel article having an L-shaped step or 90° angle into an arc, against or perpendicular to the stainless steel molecular grain. It is essential to bend the metal to form an L-shaped step as opposed to welding separate metal pieces to form the step. The rolled step shape imparts flexibility for the flange during heating and cooling conditions.

The term "heated conditions" is defined herein as a temperature above 500° C. (932° F.), preferably above 600° C. (1112° F.), more preferably above 640° C. (1184° F.), and most preferably above 676° C. (1250° F.).

Figure 5A:
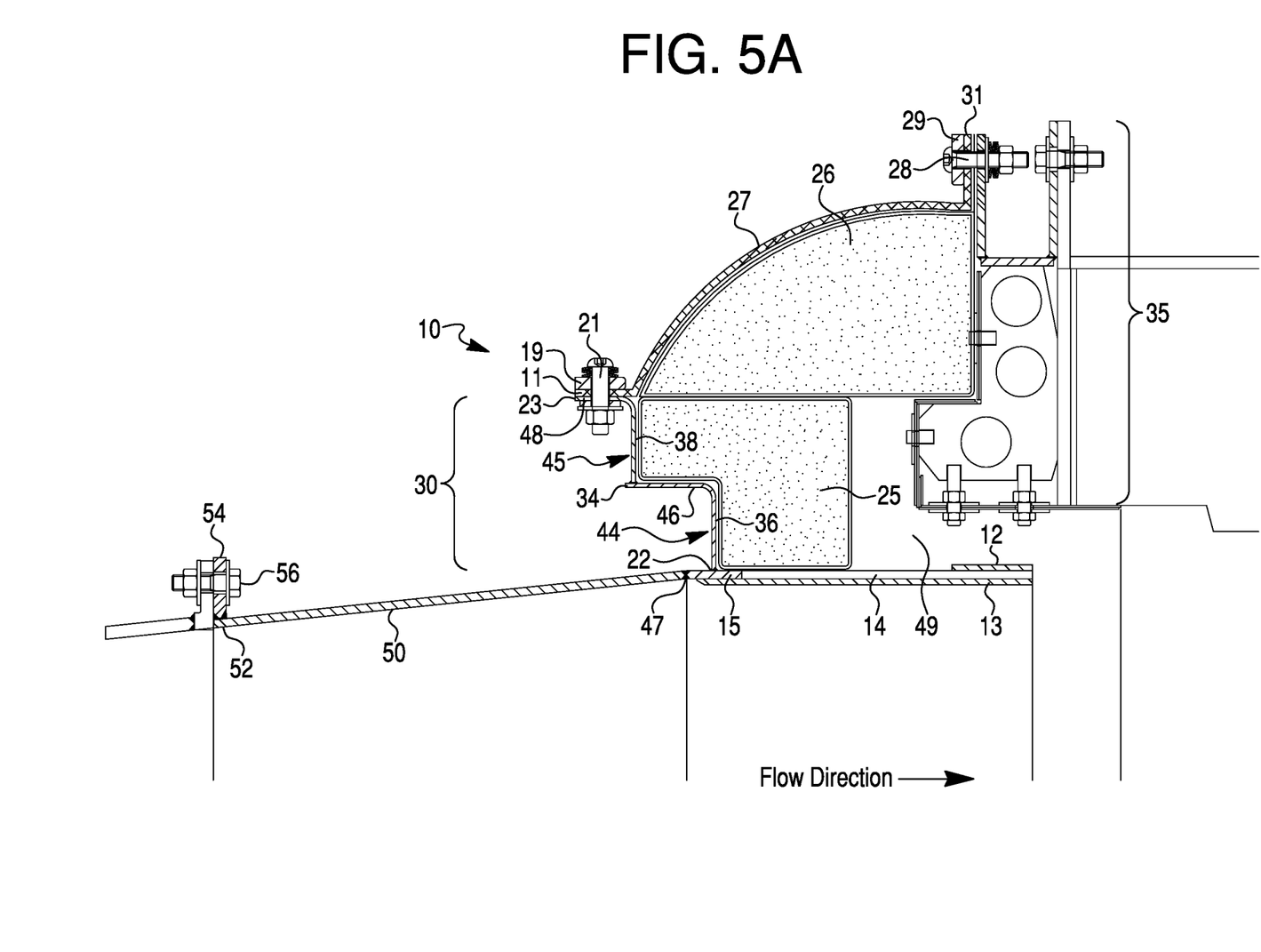
FIG. 5A is a cross-section view of the annular expansion joint of this invention during cooled conditions.
Figure 7A:
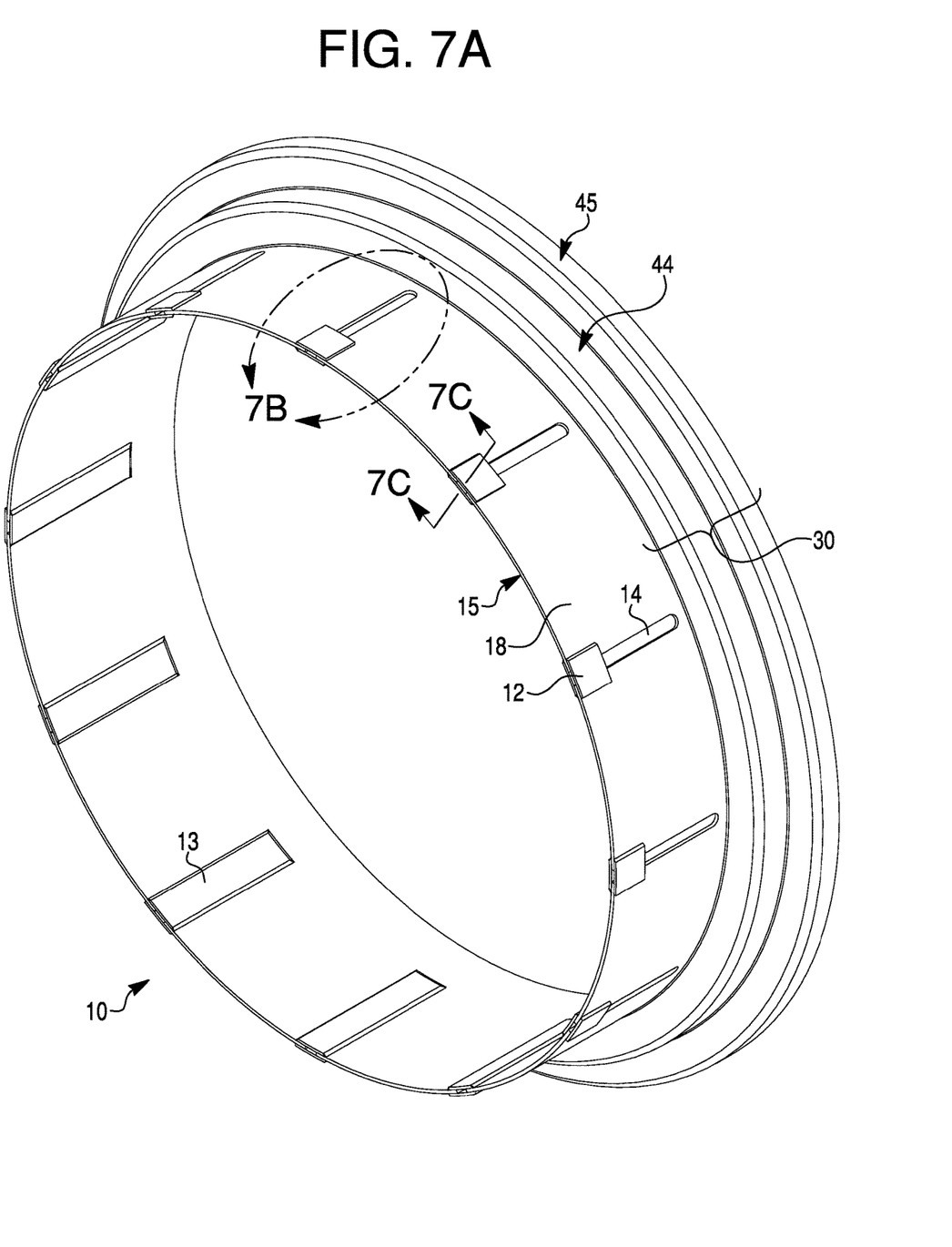
FIG. 7A is a perspective view of the expansion joint of this invention, without the insulation material.
Figure 8:
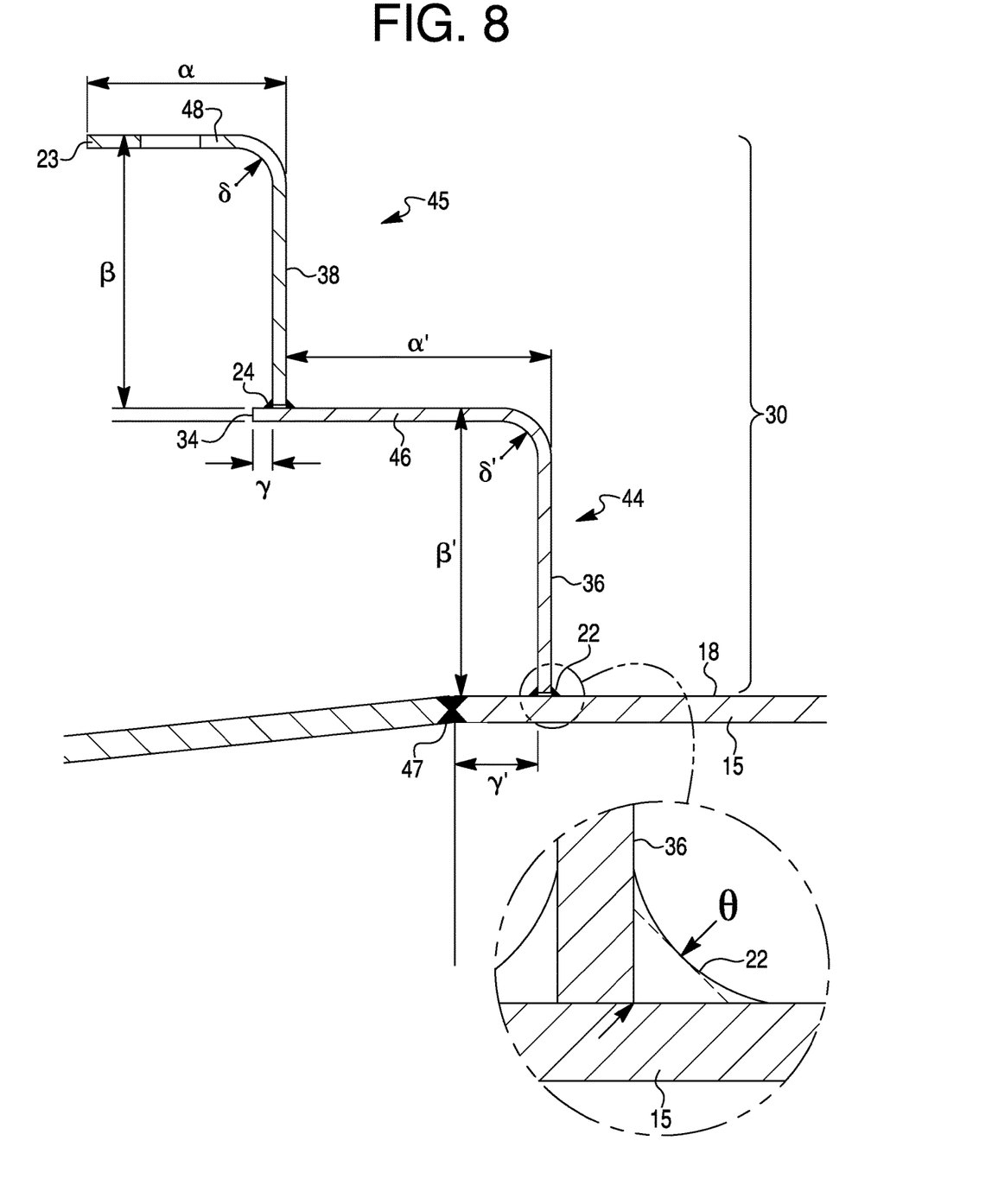
FIG. 8 is a cross-section of the dynamic flange of this invention.
Figure 9A:
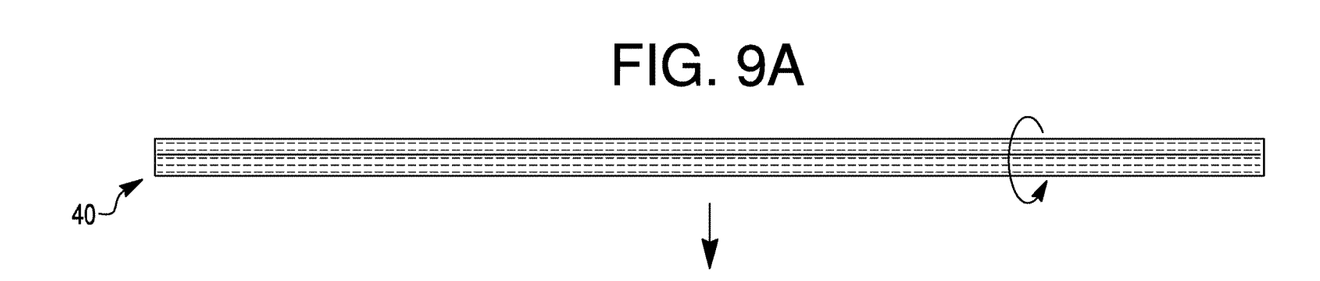
FIG. 9A is a top view of a stainless steel piece used to form the dynamic flange of this invention.

For the present invention, the expansion joint 10 includes a two-step rolled design dynamic flange 30 of thin stainless steel. The flange 30 has two welding points instead of four as shown in FIGS. 5A, 7A, and 8. Specifically, stainless steel blank 40 as thin as 3.0 to 5.5 mm, preferably 3.2 to 5 mm, and most preferably from 3.5 to 4.7 mm, is bent parallel with the micrograin structure as shown in FIG. 9A, to achieve a 90° angle (FIGS. 9B and C) and a bend radius δ of 9.5-16 mm, preferably 10-16 mm, and more preferably 11-15 mm, FIG. 9E.

Without wishing to be bound to any theory, when stainless steel is produced, rolled to thickness and heat treated, the annealing process induces ductility, softens material, relieves internal stresses, refines the structure by making it homogeneous and improves cold working properties. In the annealing process, the atoms diffuse within a solid material, and progress towards an equilibrium state to form a micrograin structure. The micrograin structure is mostly oriented with the rolling direction. This micrograin structure is shown in dotted lines in FIG. 9A.

Figure 9B:
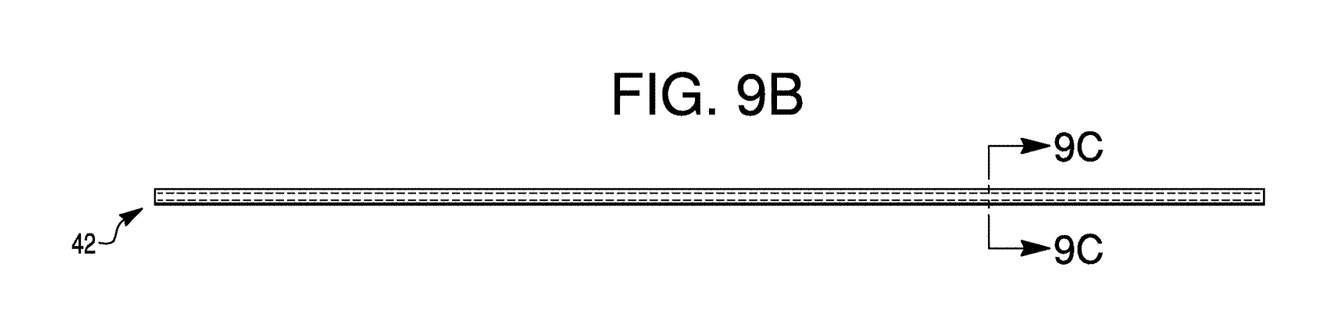
FIG. 9B is a top view of a rolled stainless steel piece.
Figure 9C:
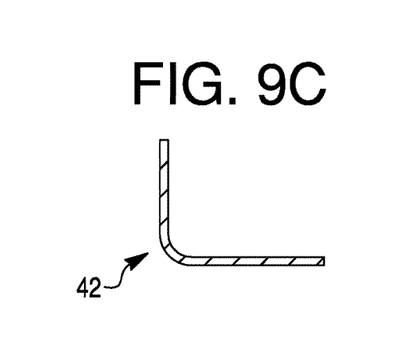
FIG. 9C is a cross-section view of a rolled stainless steel flange, taken along line 9C-9C of FIG. 9B.
Figure 9D:
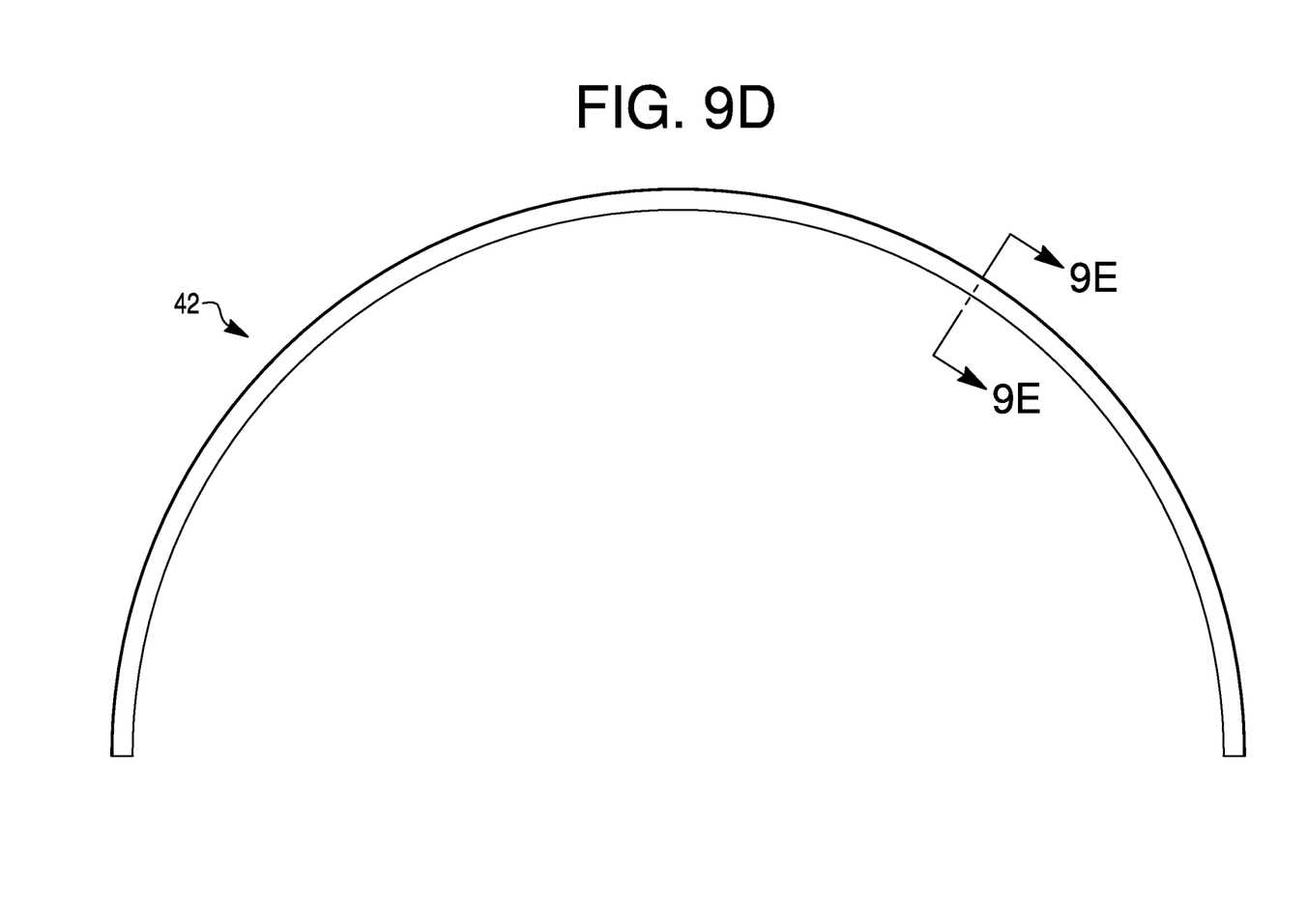
FIG. 9D is a rolled stainless steel flange that is bent in an annular condition.
Figure 9E:
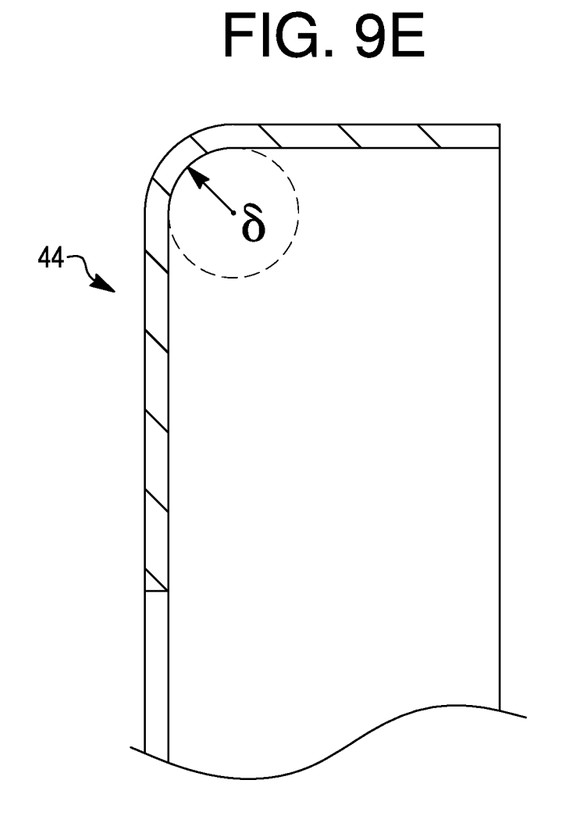
FIG. 9E is a cross-section view of the annular rolled stainless steel flange, taken along 9E-9E of FIG. 9D.

Normally, steel is bent perpendicular to the rolling direction and micrograin orientation, in which the material is manufactured. This allows for a smaller bend radius than when bent parallel to the grain boundaries. On the contrary, in accordance with the present invention and FIG. 9A, at least one stainless steel material 40 is first bent along or parallel with the manufactured molecule orientation into an L-shape step 42 as shown in FIGS. 9B and 9C. A plurality of bent stainless steel steps 42 are subsequently rolled into an arc with the direction of rolling being perpendicular to the grain orientation as shown in FIG. 9D, forming a plurality of arc pieces 42. The ends of each of the arc step 42 are then welded to form a ring, annular step 44. As shown in FIGS. 5A and 8, step 44 is formed of walls 36 and 46 having a bend radius δ'. This two-step rolling procedure is repeated for a second stainless steel piece to form a bent annular step 45 of a larger circumference compared with step 44, wherein step 45 has a bend radius δ and walls 38 and 48. As shown in FIG. 8, the annular step 45 of a larger circumference is welded at point 24 on the top of one end 34 of wall 46 of step 44 of a smaller circumference, to form a two-step dynamic flange 30. Wall 48 of step 45 and wall 46 of step 44 are parallel with cylindrical inner sleeve 15, while walls 38 and 36 of the respective steps 45 and 44 are perpendicular to cylindrical inner sleeve 15.

It has been found that the diameter of the inside of the concentric barrel formed by step 45 is compressed during the rolling process. This compression supports the start-up of the turbine. Specifically, the residual stress which is created by bending blank 40 into a step 42 will be released as a result of the enlargement of the inner barrel formed by step 44 that it is attached to step 45.

Wall 48 of step 45 has a length α of about 50-70 mm, while wall 38 of step 45 has a length β of about 60-95 mm. Step 45 has a bend radius δ of 9.5-16 mm, preferably 10-16 mm, and more preferably 11-16 mm. For step 44, wall 46 has a length α' of about 70-90 mm, wall 36 has a length β' of about 60-95 mm and has a bend radius δ' of 9.5-16 mm, preferably 10-16 mm, and more preferably 11-16 mm. Annealing point 24 between steps 45 and 44 has a distance γ from end 34 of wall 46, wherein γ is about 0-10 mm, preferably 2-8 mm, and more preferably 4-7 mm. The weld 22 between step 44 and outer surface 18 of inner sleeve 15 has a distance γ' from edge 47 of inner sleeve 15. For the present invention, the steps maintain a ratio of α to β, or α' to β' of about 1.5:1-1:2, preferably 1.2:1-1:1.5, and more preferably 1:1-1:1.3. The steps maintain ratio of α to α' of about 1:1-1:2, preferably about 1:1.2-1:1.18, and more preferably 1:1.3-1:1.6. The steps also maintain a ratio of β to β' of about 1:1-1:1.5, preferably about 1:1-1:1.3, and more preferably about 1:1-1:1.2. The steps further maintain a ratio of γ to γ' of about 1:1-1:6, preferably about 1:1-1:5, and more preferably about 1:1-1:4.3.

It has been found that the welding process used to connect step 45 to step 44 and step 44 to sleeve 15 is essential in reducing sensitization of the stainless steel for producing expansion joint 10. Typically, applications combining long-term high temperatures associated with welding, leads to cracking driven by thermal cycling. If the welding size is not reduced and the heat is not constantly controlled during the manufacturing process, cracking will progress along the grain boundaries within the weld heat-affected zone (HAZ). Welding often progresses continuously along the perimeter of the components being attached, e.g., continuous seam welding. However, too much energy and heat brought in while seam welding can cause the stainless steel plate material to become sensitized within the weld HAZ, thus reducing the corrosion resistance along the grain boundaries of the material.

Figure 4:
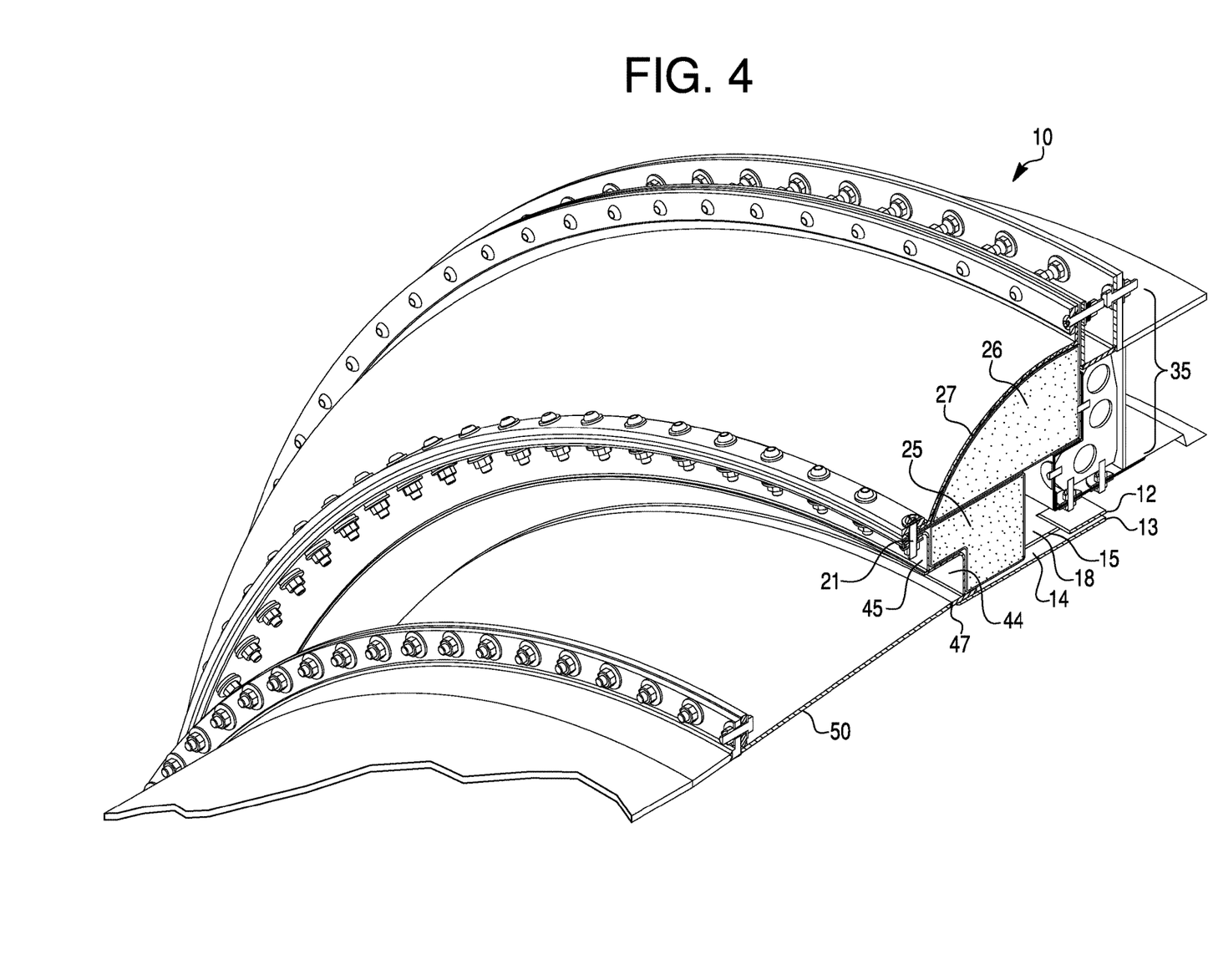
FIG. 4 is a perspective view, partially in cross-section of a rolled stainless steel dynamic flange of this invention, located within an expansion joint assembly.
Figure 6:
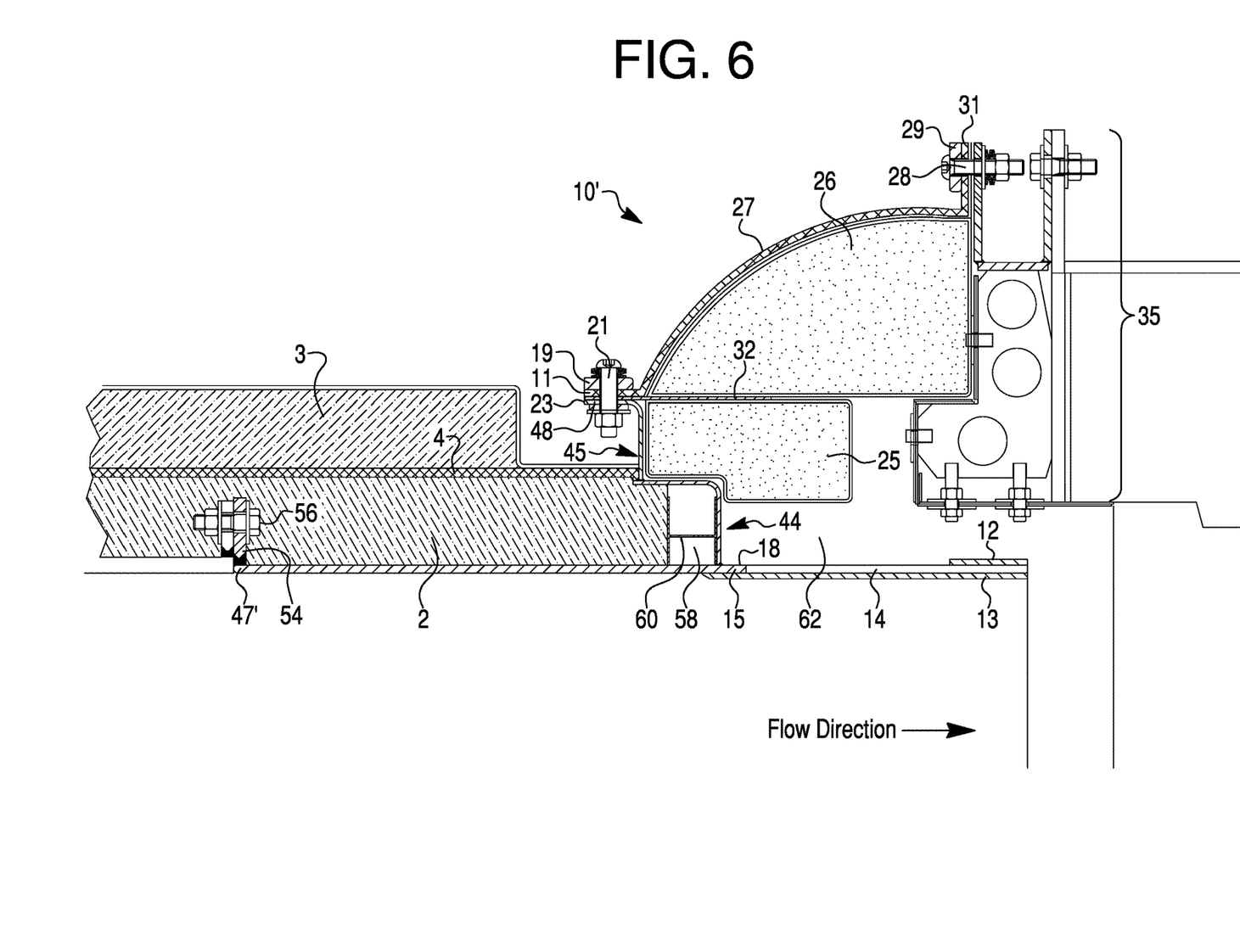
FIG. 6 is a cross-section view of an alternative expansion joint assembly of this invention.

For the present invention, the dynamic flange 30 is skip welded at 22 of wall 36 to the outer surface 18 of a cylindrical inner sleeve 15 as shown in FIGS. 4, 6 and 8 to form expansion joint 10. Specifically, a skip welding technique is used along the perimeter of the components being welded, wherein a location significantly spaced from the previous weld is welded, and so on, until the perimeter is completely welded. This welding technique avoids excessive temperatures within the weld HAZ. Accordingly, It has been found that skip welding is preferred for attaching the flange 30 to inner sleeve 15, to reduce the energy (heat) input on the components being welded. The weld throat θ (FIG. 8) of weld 22 is provided at a maximum of 3.5 mm. Accordingly, not only are the amount of welds reduced to half using the rolling procedure from each step, but also critical welding related microstructure changes of the stainless steel are avoided by the welding process.

Figure 7B:
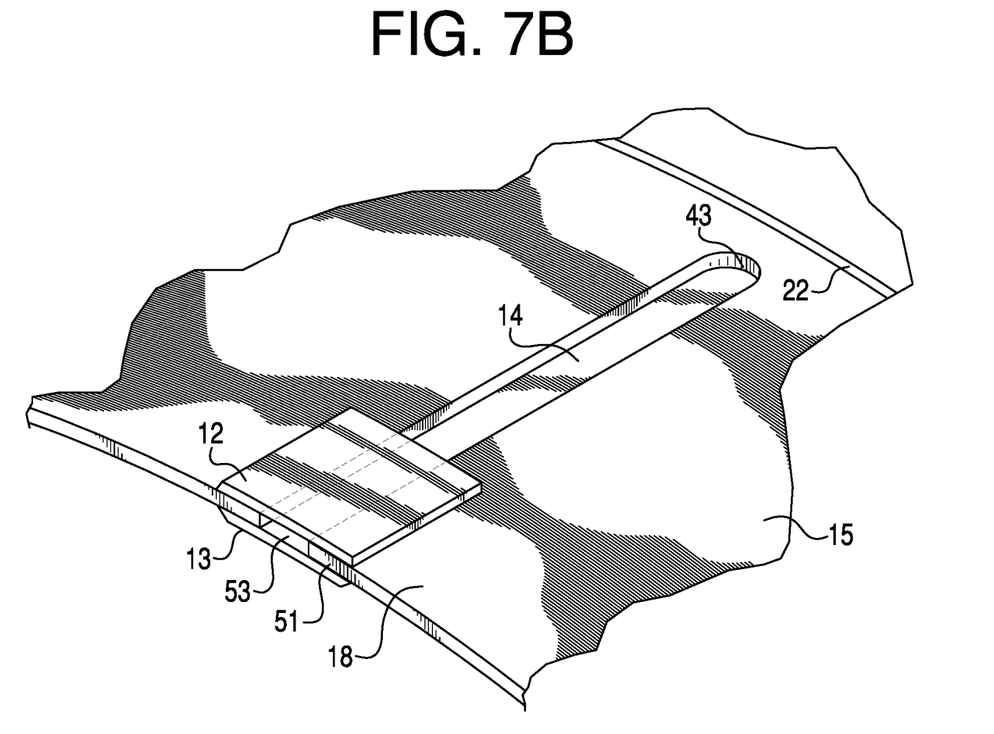
FIG. 7B is an enlarged perspective view of the expansion slot and a damping plate.
Figure 7C:
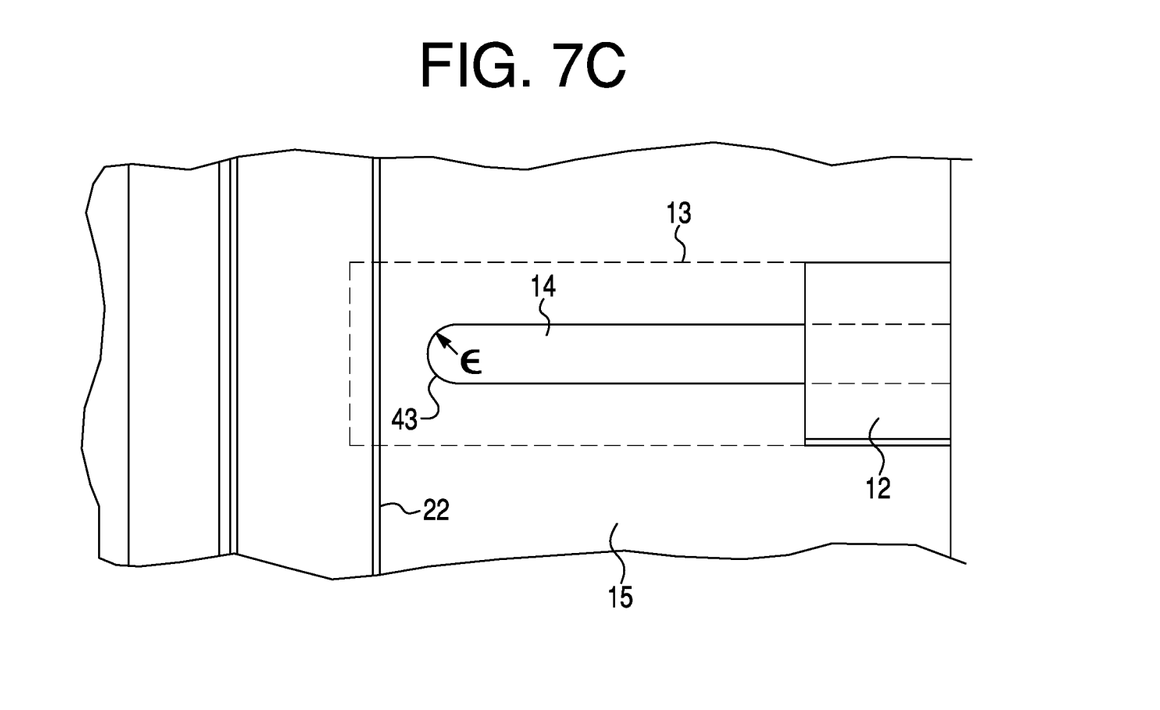
FIG. 7C is a cut-away plan view showing an expansion slot.
Figure 7D:
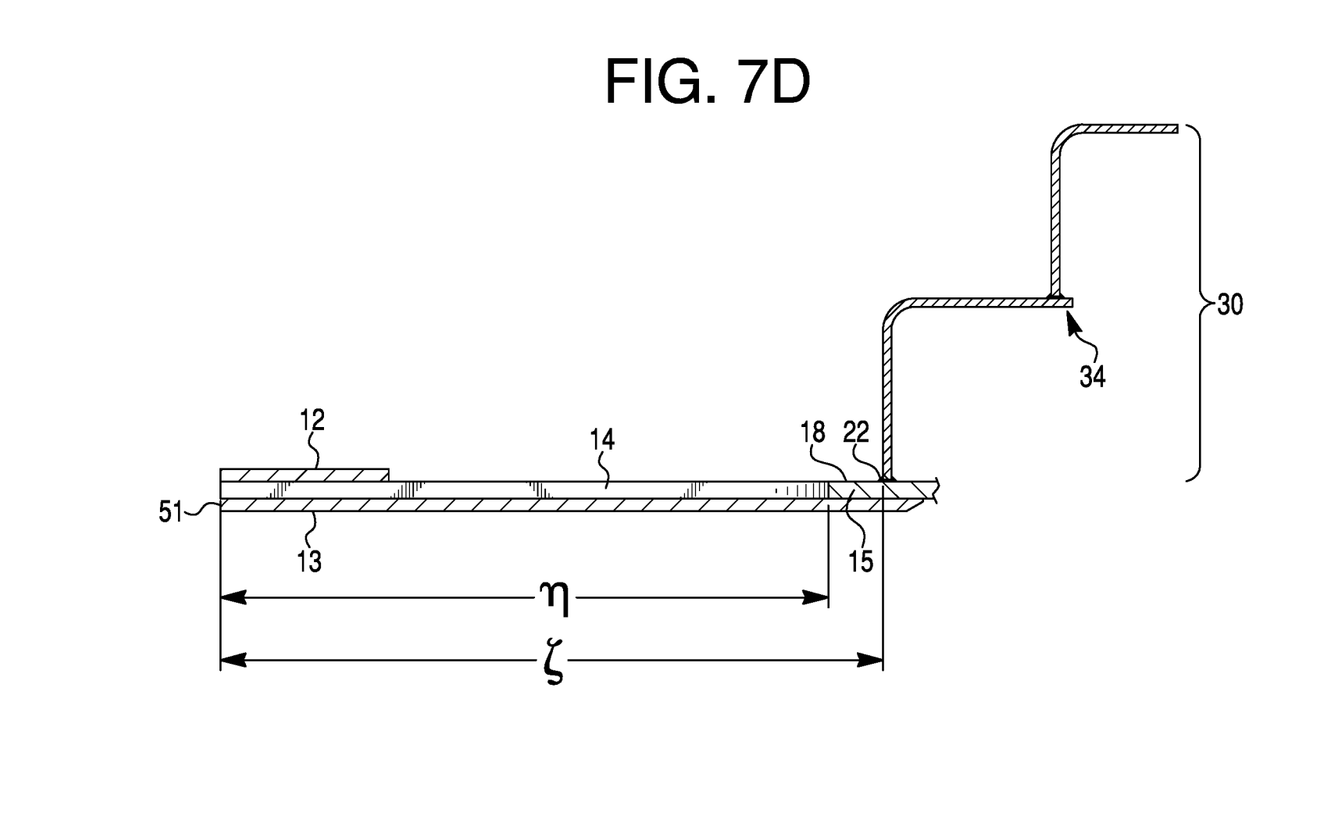
FIG. 7D is a cross-section view of the expansion joint without the insulation material.

The inner sleeve 15 optionally contains a plurality of expansion slots 14 spaced circumferentially around sleeve 15 and extending perpendicularly away from the dynamic flange 30, as shown in FIGS. 7A-7D. About 5-24, preferably 8-20, and more preferably 10-18 expansion slots 14 are present along the circumference of sleeve 15. The exact number of expansion slots depends on the diameter of inner sleeve 15; the larger the diameter, the more slots can be provided. Each expansion slot 14 has a closed end 43 adjacent to the dynamic flange 30, and an opened end 53 that extends to a free end 51 of inner sleeve 15. Each slot 14 has a length η of about 150-400 mm, a width of about 20-40 mm, preferably 25-35 mm, and more preferably 30-33 mm, and a cut radius ε for the round end 43 of about 10-20 mm, preferably about 12-18 mm, and more preferably about 14-16 mm. The ratio of the length η of the slot 14 to segment ζ between free end 51 and welding point 22 is about 1:1.2-1:2.5, preferably about 1:1.17-1:2.2, and more preferably 1:1.10-1:2. Each slot 14 is partially covered on the top of its open end 53 by a damping plate 12, and on its bottom covered by cover plate 13 as shown in FIGS. 7B, 7C and 7D. The ratio of the area coverage of the damping plate 12 to bottom cover plate 13 is about 1:3-1:6, preferably 1:4-1:5.6, and more preferably 1:4-1:5.6. Without wishing to be bound by any theory, it is believed that when inner sleeve 15 heats up with the turbine gas exhaust, inner sleeve 15 experiences uneven circumferential growth at the surface closest to the turbine exhaust, as compared to the surface closest to the diffuser duct. The uneven circumferential growth causes stress and metal fatigue overtime, and further accelerates cracking at weld 22 of flange 30 with inner sleeve 15. The presence of expansion slots 14 relieves the uneven circumferential growth due to heat, and thus, reduces stress at the weld 22, prolonging the life of expansion joint 10.

As shown in FIGS. 4 and 5A, expansion joint 10 is incorporated into an expansion joint assembly, which comprises the expansion joint 10, a cover 27, at least one insulation material 26, extension annular wall 50, and a support frame structure 35. Wall 48 of step 45 is fastened with clamp bar 19 to cover 27 by fastener 21. Cover 27 is also fastened on end 31 with clamp plate 29 to part of support frame structure 35 by fastener 28. Cover 27 covers the outer side of dynamic flange 30 that faces away from the turbine exhaust, outer surface 18 of inner sleeve 15, and expansion slots 14. Cover 27 is preferably made of material such as glass fiber coated with fluorocarbon (Teflon). An annular wall extension 50 matches the diameter of inner sleeve 15 and connects to the inner sleeve 15 on one end 47, and to the turbine exhaust duct on the other end 52. The annular wall extension 50 is bolted to the gas turbine exhaust duct via clamp bar 54 and fastener 56, such that the annular wall extension 50 is optionally sloped as shown in cross-section FIG. 5A, or having a gradually increasing diameter from end 52 to end 47, to mitigate heat expansion of the exterior upon inner sleeve 15 during heated conditions.

At least one insulation material extends from beneath cover 27 to dynamic flange 30 and outer surface 18 of sleeve 15 and expansion slots 14. Preferably, two blocks of insulation material 25 and 26 are provided, wherein the insulation material 26 conforms to the shape of the inner area of the cover 27, and insulation material 25 conforms to the shape of flange 30 and covers part of, preferably 30%, more preferably 40% of slot 14, leaving an air space 49 behind insulation material 25 to provide room to accommodate expansion of insulation material 25 during heated conditions. Because cover 27 and flange 30 contract at different rates and exhibit different morphology under heating and cooling conditions, use of separate insulation materials allows each material to conform to the different moving parts to ensure efficient coverage. The insulation material is preferably a knitted stainless steel filled with ceramic insulation, including, for example, silica, alumina, silica-alumina, aluminosilicates, amorphous calcium, magnesium silicates, etc. The exact form of insulation can vary and be beads, sheet, fiber, wool, etc. as known in the art. The insulation material should be able to withstand temperatures of greater than 1200° F.

Figure 5B:
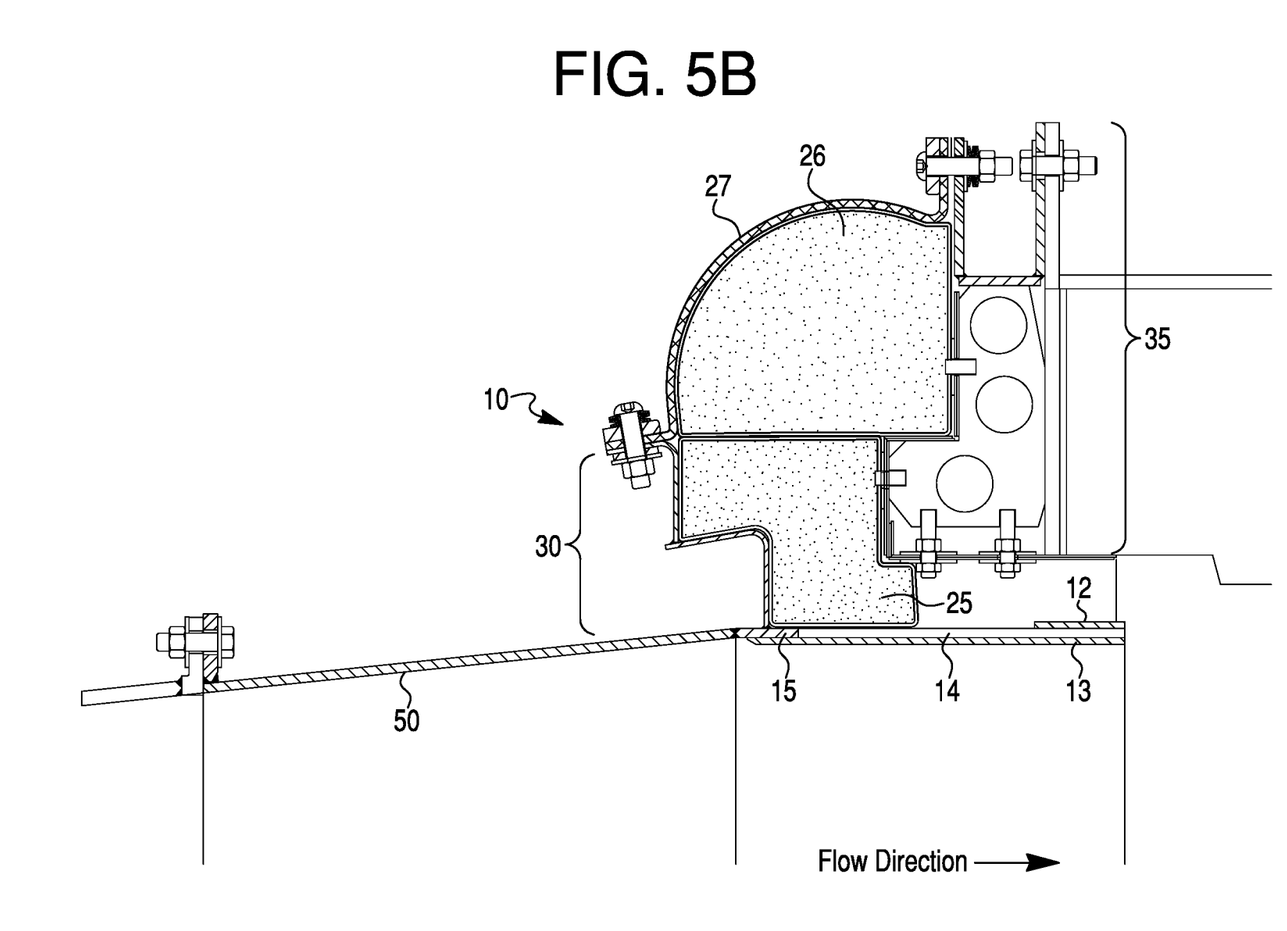
FIG. 5B is a cross-section view of the expansion joint assembly of this invention during heated conditions.

Support frame structure 35 is located behind expansion joint 10 and adjacent to the diffuser duct 90. Support frame structure 35 is represented, but not limited to, the structure as depicted in FIGS. 5A, 5B and 6, and maintains its structure regardless of the temperature change during start-up and/or cool down. FIG. 5A illustrates the expansion joint 10 under cooling conditions, wherein FIG. 5B illustrates expansion joint 10 under heated conditions. During heated conditions, as shown in FIG. 5B, dynamic flange 30 contracts and bends according to heat stress. Extension wall 50 and cylindrical inner sleeve 15 are also being pulled backwards in the direction of turbine gas flow and shifts upward, such that insulation material 25 is compressed by dynamic flange 30 and inner sleeve 15. Expansion slots 14 also shift backwards in the direction of gas flow along with sleeve 15, and contract to relieve the uneven circumferential growth due to heat. Cover 27 contracts due to flange 30 and the heated condition, and in turn is compressed upon insulation material 26, while support frame structure 35 remains unchanged and anchors the entire heated expansion joint assembly 10. Optionally, additional insulation material (not shown) can be placed above wall extension 50, and a spacer 60 may be placed under step 44 in the direction of the turbine exhaust duct (FIG. 6) to maintain an air gap 58 over sleeve 15.

An alternative layout for the expansion joint and assembly is shown in FIG. 6 in cooled condition. The alternative expansion joint comprises the expansion joint 10', a cover 27, at least one insulation material 25, 26, and a support frame structure 35. In this embodiment, inner sleeve 15 is directly fastened on its end 47' to clamp bar 54 with turbine exhaust duct by fastener 56. A heat plate 32 is fastened together with end 11 of cover 27 and end 23 of wall 48 by fastener 21, wherein heat plate 32 extends between and adjacent to insulation materials 25 and 26, such that insulation material 26 is anchored by heat plate 32 to remain underneath cover 27, and insulation material 25 conforms to and is anchored by the shape of the flange 30. Insulation material 25 is elevated above both the outer surface 18 and slots 14 of inner sleeve 15, leaving a heat dissipation gap 62 that facilitates heat dissipation from the gas turbine exhaust, and reduces metal stress and fatigue on flange 30. Without wishing to be bound by any theory, heating plate 32 absorbs heat during heated conditions, and thus, lessens the heat stress exerted on end 23, step 44 and the entire flange 30.

Upstream from dynamic flange 30 and surrounding and juxtaposed to inner sleeve 15 is a block of insulation 2, wherein the insulation material 2 can withstand temperatures of greater than 1200° F. Further shown in FIG. 6 is a glass fiber fabric 4 placed concentrically around insulation 2. An additional insulation pillow 3 is shown around insulation 2. A spacer 60, previously described and located under and adjacent to step 44, maintains insulation 2 in a proper spaced relationship, and creates an air space 58 to improve control of thermal expansion and/or contraction of inner sleeve 15. Spacer 60 is not permanently attached to step 44, and not limited to the shape as depicted in FIG. 6, as long as it is allowed to expand and contract to maintain the open air space under step 44. Expansion joint 10' may also exclude spacer 60 and airspace 58, and instead insulation 2 may extend underneath and adjacent to step 44. The expansion joints 10 and 10' as depicted in FIGS. 5A and 6 are good for at least 1200 cycles and 5 to 10 years performance in service.

The invention claimed is:

1. An expansion joint for interconnecting two ducts, comprising:
   1) a cylindrical inner sleeve, and
   2) an annular stainless steel dynamic flange that is of a two-step shape;
   wherein said dynamic flange is located adjacent and perpendicular to an outside surface of said cylindrical inner sleeve, said dynamic flange comprising:
   a) a first annular bent step; and
   b) a second annular bent step;
   wherein said first annular bent step is welded on one end to a first end of said second annular bent step, and said second annular bent step is welded on a second end to said outer surface of said inner sleeve, such that said first and said second annular bent steps each has a wall that is parallel to said cylindrical inner sleeve and a second wall that is perpendicular to said cylindrical inner sleeve, wherein a ratio of a length of said parallel wall of said first or second annular bent step to a length of said perpendicular second wall of said first or second bent annular step is about 1.5:1 to 1:2, and a plurality of expansion slots are spaced on said cylindrical inner sleeve such that said plurality of expansion slots are adjacent and perpendicular to said dynamic flange.

2. The expansion joint of claim 1, wherein said dynamic flange is made of stainless steel containing 18-20 wt. % chromium and said steel has a tensile strength of approximately 75,000 PSI minimum and a yield strength of approximately 30,000 PSI minimum.

3. The expansion joint of claim 1, wherein said stainless steel flange has a thickness of 3.0-5.5 mm.

4. The expansion joint of claim 3, wherein said stainless steel flange has a thickness of 3.5-4.7 mm.

5. The expansion joint of claim 1, wherein said first and said second bent annular steps each has a bend radius of 9.5-16 mm.

6. The expansion joint of claim 5, wherein said first and said second bent annular steps each has a bend radius of 11-16 mm.

7. The expansion joint of claim 1, wherein the ratio of the length of said parallel wall of said first or second annular step to the length of said perpendicular second wall of said first or second annular step is about 1.2:1 to 1:1.5.

8. The expansion joint of claim 1, wherein a ratio of the length of said parallel wall of said first annular step to the length of said parallel wall of said second annular step is about 1:1-1:2.

9. The expansion joint of claim 8, wherein said ratio is about 1:1.2-1:1.8.

10. The expansion joint of claim 1, wherein each of said plurality of expansion slots has an open end that coincides with the free end of said inner sleeve opposite to said dynamic flange, and a round closed end adjacent to said dynamic flange.

11. The expansion joint of claim 10, wherein a top of said open end of said slot is partially covered by a damping plate.

12. The expansion joint of claim 10, wherein a cover plates covers a bottom of said slot.

13. The expansion joint of claim 1, wherein said plurality of expansion slots comprise 5-24 slots spaced on said cylindrical inner sleeve.

14. An expansion joint assembly comprising said expansion joint of claim 1, the cover, at least one insulation material, and a support frame structure, wherein a cover covers said expansion joint, wherein said at least one insulation material extends from underneath said cover to conform to a shape of and adjacent to said dynamic flange and said outside surface of said inner sleeve, and said support frame structure anchors said expansion joint assembly and connects to a diffuser duct wherein the plurality of expansion slots are parallel to gas flow.

15. The expansion joint assembly of claim 14, wherein said support frame structure is located behind said expansion joint and above said inner sleeve, and said assembly further includes an air gap between said insulation material and said support frame structure.

16. The expansion joint assembly of claim 14, wherein said cylindrical inner sleeve has a free end and an opposite end connected to a gas duct.

17. The expansion joint assembly of claim 14, wherein said cylindrical inner sleeve has a free end and a closed second end connected to an expansion annular wall, which is connected to a gas duct.

18. The expansion joint assembly of claim 14, wherein an insulation material is located under said second annular step.

19. The expansion joint assembly of claim 14, wherein said cover is fastened together with a free end of said first annular step.

20. The expansion joint assembly of claim 14, wherein said cover covers said expansion joint and at least one insulation material extends from underneath said cover, such that said at least one insulation material conforms to the shape of and adjacent to said dynamic flange, and elevates above said outside surface of said cylindrical inner sleeve.

* * * * *